(12) United States Patent
Schlatterbeck et al.

(10) Patent No.: US 12,168,364 B2
(45) Date of Patent: Dec. 17, 2024

(54) METHOD AND DEVICE FOR PRINT ENHANCEMENT

(71) Applicant: ACTEGA Schmid Rhyner AG., Adliswil-Zurich (CH)

(72) Inventors: Dirk Schlatterbeck, Friltschen (CH); Roland Rüedi, Wädenswil (CH); Peter Eladio Ludwig, Zürich (CH); Dieter Wyler, Kloten (CH)

(73) Assignee: ACTEGA Schmid Rhyner AG, Adliswill-Zurich (CH)

( * ) Notice: Subject to any disclaimer, the term of this patent is extended or adjusted under 35 U.S.C. 154(b) by 810 days.

(21) Appl. No.: 17/256,486

(22) PCT Filed: Jun. 17, 2019

(86) PCT No.: PCT/EP2019/065804
§ 371 (c)(1),
(2) Date: Dec. 28, 2020

(87) PCT Pub. No.: WO2020/002010
PCT Pub. Date: Jan. 2, 2020

(65) Prior Publication Data
US 2021/0221164 A1    Jul. 22, 2021

(30) Foreign Application Priority Data
Jun. 29, 2018 (DE) .................. 10 2018 115 748

(51) Int. Cl.
*B44C 1/14*   (2006.01)
*B32B 15/12*  (2006.01)
(Continued)

(52) U.S. Cl.
CPC ............. *B44C 1/145* (2013.01); *B32B 15/12* (2013.01); *B41J 11/0015* (2013.01); *B41M 5/52* (2013.01); *B44C 1/1741* (2013.01)

(58) Field of Classification Search
None
See application file for complete search history.

(56) References Cited

U.S. PATENT DOCUMENTS

2010/0212821 A1    8/2010  Grinberg et al.
2013/0032283 A1   12/2013  Walsh

FOREIGN PATENT DOCUMENTS

CN    103717387 A    4/2014
DE    44 40 762 C1   4/1996
(Continued)

OTHER PUBLICATIONS

DE 19951404 A1 English translation (Year: 2001).*
(Continued)

*Primary Examiner* — Jeffrey D Washville
(74) *Attorney, Agent, or Firm* — Sughrue Mion, PLLC

(57) ABSTRACT

The invention provides a method for enhancing printed products (3), wherein the method comprises partially coating a substrate (2) with a varnish (4) on one side (20) such that there are at least one coated area (22) and at least one uncoated area (21) on the side (20). Subsequently, a foil (6) is applied to the side (20) that is coated with the varnish (4) and is adhesively bonded to the substrate (2), wherein the foil (6) is designed so as to adhere to the material of the substrate, but not to the varnish (4), so that the adhesive bonding of the foil (6) occurs selectively in the at least one uncoated area (21). Following the adhesive bonding, the foil (6) is severed along the dividing line (23) between the coated and uncoated areas (21, 22), so that a substrate (2) is obtained which has at least one area (22) of a side (20) coated with varnish (4), and an adjoining area (21) not coated with the varnish (4), wherein a foil (6) is adhesively
(Continued)

bonded to the substrate in the area not coated with the varnish (4), with the edge (60) of the foil adjoining the area (22) coated with varnish (4).

21 Claims, 4 Drawing Sheets

(51) Int. Cl.
    *B41J 11/00*     (2006.01)
    *B41M 5/52*     (2006.01)
    *B44C 1/17*     (2006.01)

(56)     References Cited

FOREIGN PATENT DOCUMENTS

| | | | |
|---|---|---|---|
| DE | 19951404 A1 * | 5/2001 | ............... B44C 1/14 |
| DE | 10 2012 218 022 A1 | 5/2013 | |
| RU | 2 170 178 C2 | 7/2001 | |
| RU | 2 325 957 C2 | 6/2008 | |

OTHER PUBLICATIONS

International Search Report for PCT/EP2019/065804 dated Oct. 1, 2019 [PCT/ISA/210].
Written Opinion for PCT/EP2019/065804 dated Oct. 1, 2019 [PCT/ISA/237].

* cited by examiner

METHOD AND DEVICE FOR PRINT ENHANCEMENT

CROSS REFERENCE TO RELATED APPLICATIONS

This application is a National Stage of International Application No. PCT/EP2019/065804 filed Jun. 17, 2019, claiming priority based on German Patent Application No. 10 2018 115 748.7 filed Jun. 29, 2018.

The invention generally relates to the field of manufacturing printed products. More particularly, the invention relates to print enhancement of printed products using foils.

Print enhancement is generally understood to mean an alteration of the surface of printed products. Typically, such enhancement is of aesthetic nature in order to modify the surface haptically and visually. Also, the surface can be protected against wear, fading, or the absorption of dirt, for example, in order to improve the durability of the printed product. One example of such a technique is sealing, in which the printed product is covered with a plastic film over its entire surface and on both sides. One-sided full-surface lamination with plastic films is also widely used in the graphics industry.

One technique of print enhancement comprises local application of varnish to smooth coated areas or to impart a gloss to the surface with the varnish layer. For this process, screen printing and inkjet printing are employed, inter alia. UV-curing varnishes are particularly suitable for the inkjet printing process, as they can be cured quickly after application and, moreover, the risk of the varnish solidifying in the nozzles of the print head is avoided.

Another technique used for print enhancement is the application of foils to the printed product. Metallized foils allow to achieve visual effects, for example in order to produce gold or silver-colored lettering and decorations. Also, an embossing effect is often involved in this case to additionally highlight the metallized areas both visually and haptically. A common technique for this purpose is hot foil stamping which involves bonding a coating provided on the underside of the carrier film to the substrate under pressure by a heated metal die. At the same time, the metal die causes embossing of the substrate. The carrier film is peeled off after the embossing and only the coating remains on the substrate to be enhanced. For producing a metallized enhancement, at least one layer of the coating on the carrier film is a metal layer, mostly produced by vapor deposition of aluminum.

US 2010/0212821 A1 discloses a method for producing a relief with foil lamination. It comprises depositing a curable adhesive to a substrate and pressing a foil onto it so that it comes into contact with the adhesive. By applying energy during the pressing process, the adhesive and the foil are caused to adhere to one another.

As with the aforementioned method, the foil usually is the top layer or defines the surface of the finished printed product. In many cases, this is also desirable for aesthetic reasons. On the other hand, it would also be desirable if foil-laminated surfaces could be combined with varnished surface areas. However, this process is often only possible in two steps, for example if the station for applying the adhesive for the foil is also used for applying varnish. If the foil is intended to be embossed on an already varnished surface in a second process step, this can either be achieved by means of an embossable varnish on which the foil adheres, or the varnish has to be omitted in the area that is intended for the foil stamping. In the latter case, the main problem is that in the case of inaccurate fit, the foil will overlap with the varnish along the boundary areas.

The invention is therefore based on the object of providing a method which allows to provide a print enhancement including a combination of varnished and foil-laminated areas, which avoids the problems mentioned above. This object is achieved by the subject-matter of the independent claims. Advantageous embodiments are specified in the dependent claims.

Accordingly, the invention provides a method for enhancing printed products, which comprises partially coating a substrate on one side with a varnish so as to obtain at least one coated area and at least one uncoated area on this side, and subsequently applying a foil onto the side coated with the varnish and adhesively bonding it to the substrate, wherein this foil is designed so as to adhesively bond to the material of the substrate, but not to the varnish, so that the adhesive bonding of the foil occurs selectively in at least one uncoated area, and wherein following the adhesive bonding, the foil is severed along the dividing line between the coated and uncoated areas so that a substrate is obtained which has at least one area coated with varnish on one side, and an adjacent area not coated with this varnish, with a foil adhesively bonded to the substrate in the area not coated with varnish, with the edge thereof adjoining the area coated with varnish.

The invention thus allows to create a surface of a printed product, which is subdivided into varnish-coated and foil-laminated areas, with both the varnish and the foil being directly bonded to the material of the substrate. This also allows for new aesthetic design options, with both transparent and opaque varnish. Therefore, more generally, a transparent or an opaque varnish can be used in embodiments of the invention. According to yet another embodiment of the invention, at least two different varnishes can be used which are applied to different areas of the substrate side.

The substrate processed according to the invention may represent the printed product per se. However, further processing into a finished printed product is also possible. Such further processing may include cutting to size, but also printing, and in particular also further finishing steps. According to yet another embodiment of the invention, the substrate serves as an intermediate substrate and is used to pattern the foil provided on the carrier based on the pattern of the varnish, by transferring portions of the foil coating to the intermediate substrate. The foil patterned in this way is then transferred to a second substrate in a further step. The pattern of the transferred foil then corresponds to the pattern of the varnish on the intermediate substrate.

Accordingly, the invention also provides a method for enhancing printed products, which comprises partially coating a substrate on one side with a varnish so as to obtain at least one coated area and at least one uncoated area on this side, and subsequently applying a foil onto the side coated with the varnish and adhesively bonding it to the substrate, wherein this foil is designed so as to adhesively bond to the material of the substrate, but not to the varnish, so that the adhesive bonding of the foil occurs selectively in the at least one uncoated area, and wherein following the adhesive bonding, the foil is severed along the dividing line between the coated and uncoated areas so that two complementary portions of the foil are obtained, of which a first portion is bonded to the substrate, and the second portion, after having been separated, is bonded to a second or further substrate. The first substrate has at least one area coated with varnish on one side, and an adjacent area not coated with this varnish, and the foil is adhesively bonded to the substrate in this area not coated with the varnish, and the edge of the foil adjoins the area coated with varnish. The second portion of the foil does not need to be entirely adhesively bonded to the second substrate. Rather, the second substrate may also have areas selectively coated with varnish to which the foil does not adhere, so that a further portion of the foil remains, and so that the second substrate has at least one area coated with varnish and an adjacent area not coated with this varnish, and the foil is adhesively bonded to the substrate in this area not coated with the varnish, and the edge of the foil adjoins the area coated with varnish. In short, the portion of the foil that is not adhesively bonded to the substrate which represents an auxiliary substrate, is at least partially adhesively bonded to a second substrate so that the second substrate has areas provided with foil which are at least in part complementary to the areas provided with foil of the substrate representing an auxiliary substrate.

The invention will now be explained in more detail with reference to the figures, wherein.

Figure 5:
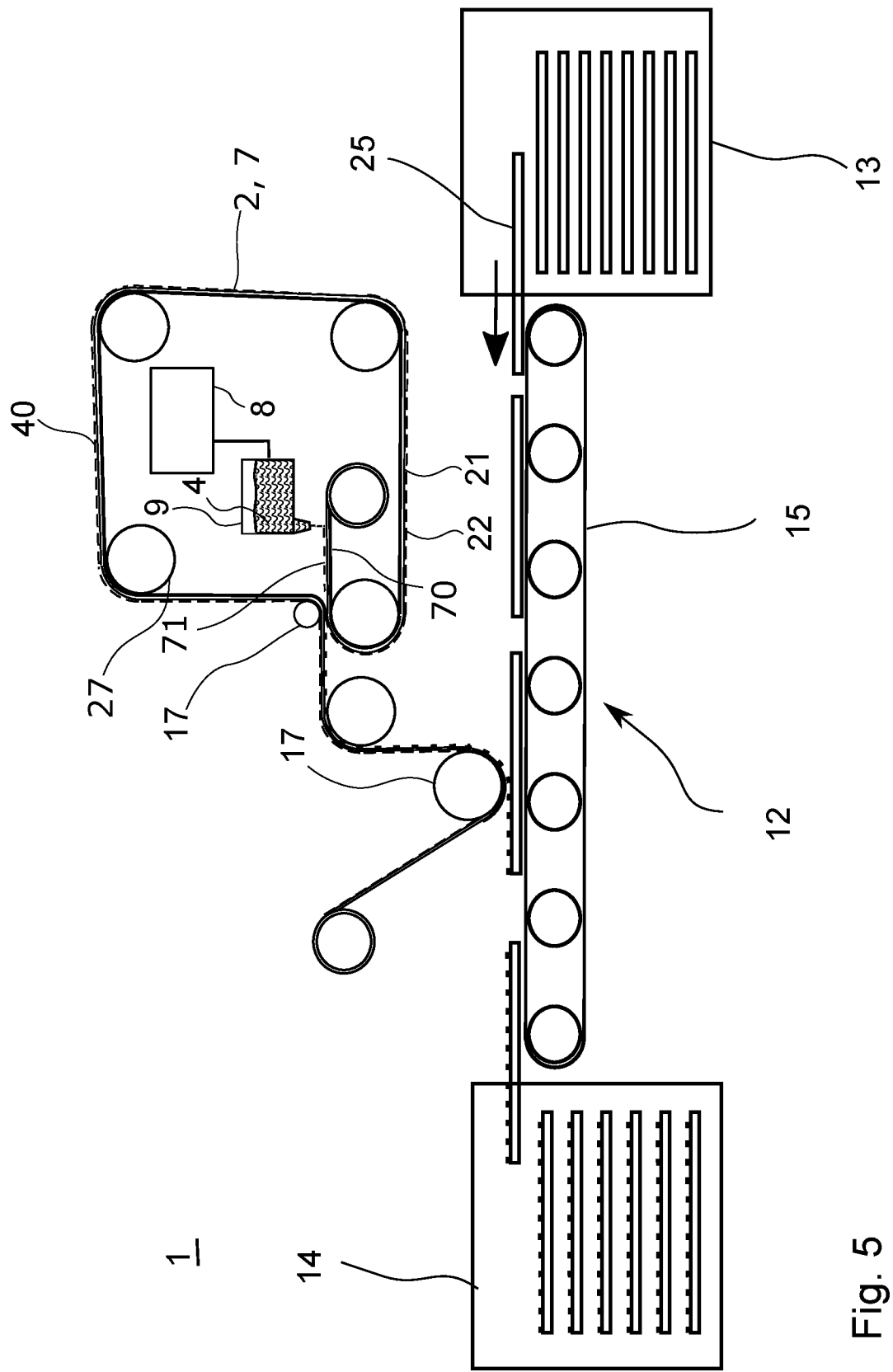

FIG. 5 a device which can be used to provide substrates with a foil

Figure 1:
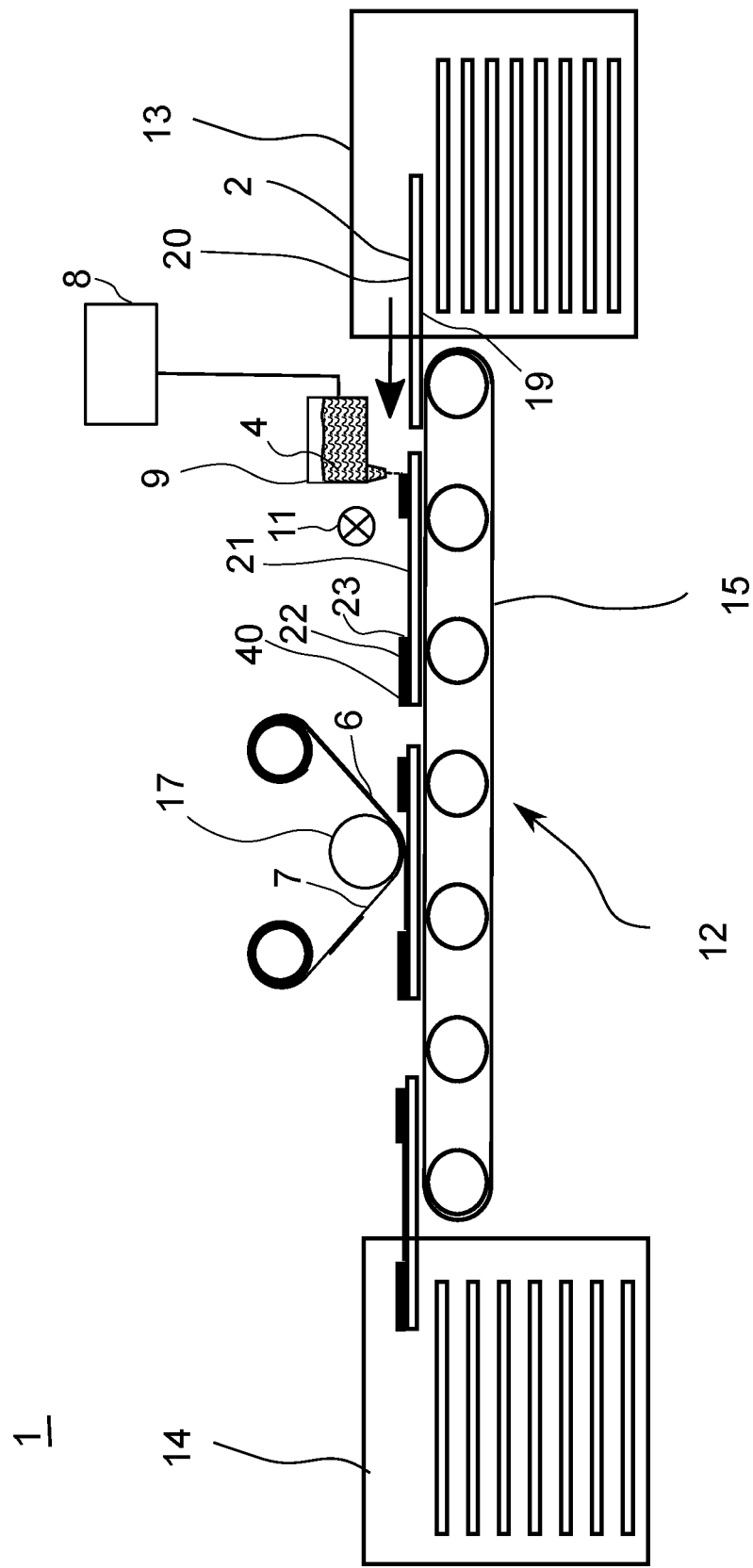
FIG. 1 shows a device for processing substrates for printed products.

FIG. 1 shows an embodiment of a device for performing the method according to the invention. In accordance with the method, the device for enhancing printed products comprises means for partially coating one side 20 of a substrate 2 for a printed product with a varnish 4 in such a way that there are at least one coated area 22 and at least one uncoated area 21 on the side 20;

a foil 6 for being adhesively bonded to the substrate; and means for applying and adhesively bonding the foil 6 to the substrate 2 on the side 20 coated with the varnish 4;

wherein the foil 6 is designed so as to adhesively bond to the material of the substrate 2, but not to the varnish 4, so that the adhesive bonding of the foil 6 is achieved selectively in at least one uncoated area 21; and means for severing the foil 6 along the dividing line or boundary 23 between the coated and uncoated areas 21, 22 following the adhesive bonding, so that a substrate 2 is obtained which has at least one area 22 coated with varnish 4 on one side 20, and one adjacent area 21 not coated with this varnish 4, wherein a foil 6 is adhesively bonded to the substrate in this area not coated with varnish 4, and the edge 60 of the foil adjoins the area 22 coated with varnish 4.

Particularly preferred substrates 2 are generally those made of paper or cardboard, as usually used for printed products. However, other materials are also conceivable, such as label substrates, plastic sheets or plastic films, laminated materials, fabrics, or nonwoven fabrics.

The foil 6 is typically very thin and tears easily. This makes sense in terms of facilitating the separation at the boundary of the uncoated area 21. In order to be able to handle the thin foil 6, it is generally contemplated according to a preferred embodiment of the invention, that the foil 6 is applied on a carrier film 7, and for adhesively bonding the foil 6, the carrier film is pressed against the substrate 2 with the side on which the foil 6 is provided. More generally, it is therefore contemplated according to one embodiment, that the device comprises means for pressing a carrier film 7 with the foil 6 applied thereon onto the substrate 2 in order to transfer the foil 6 from the carrier film 7 to the substrate 2.

In the example of FIG. 1, the carrier film 7 with the foil 6 to be adhesively bonded is coiled up into a roll and is unwound while the substrates 2 are being conveyed through the device 1. The pressing is effected using a pressure roller 17 around which the carrier film 7 is directed in contact therewith. As the carrier film 7 is guided over the pressure roller 17, the carrier film is moreover re-lifted from the substrate 2 once the foil 6 has been adhesively bonded to the substrate 2. As a result, the foil 6 is separated and areas that have not been adhesively bonded to the substrate 2 will remain adhering on the carrier film 7. The pressure roller 17 therefore also functions as a means for severing the foil 6 along the boundary 23 between the area 22 coated with varnish 4 and the uncoated area 21, subsequently to the adhesive bonding.

Generally, as in the illustrated example, a conveyor means 12 may be provided to move the substrates 2 past the means for partially coating with a varnish 4 and for applying and adhesively bonding the foil 6 to the substrate 2 on the side 20 coated with the varnish 4.

According to one embodiment, as illustrated in FIG. 1, the conveyor means 12 comprises a conveyor belt 15. The substrates 2 in the form of sheets, preferably made of paper or cardboard, are placed on the conveyor belt 15 by a sheet feeder 13, and after having been processed they are removed therefrom and stacked by a sheet discharger 14.

Otherwise than illustrated, roll-to-roll processing is also conceivable, in which case there will not be individual sheet-like substrates fed in, but instead a coiled-up sheet-like substrate 2 will be unwound from a roll, processed according to the invention by applying varnish 4 and foil 6, and will then be wound up again. Separation into sheets after the processing of the web-like substrate is also possible according to one embodiment.

According to a preferred embodiment of the invention, a digital printing process is used to produce a varnish layer 40 by applying varnish 4 in particular areas. It is in particular contemplated according to an embodiment of the invention that the means for partially coating one side 20 of the substrate 2 comprise an inkjet print head 9 which emits the varnish 4 drop by drop onto the substrate 2 in response to control signals from a control device 8. The partial coating of the substrate 2 with a varnish 4 by ejecting droplets of the varnish 4 from the inkjet print head 9 in response to control signals from the control device 8 is in particular performed while the substrate 2 is moved relative to the inkjet print head 9. In this way, the droplets are placed next to one another on the surface and can cover a quite large continuous area of the substrate 2. It may not be necessary for the droplets to form a contiguous layer, as long as the varnish prevents the foil 6 from adhering in the coated area 22.

In principle, however, any technique that allows to apply varnish in a patterned fashion is eligible for the purposes of the invention. Flexographic printing, pad printing, intaglio printing, and screen printing are suitable, among others. Therefore, according to one embodiment of the invention, the varnish is applied using any one of the aforementioned techniques. In principle, it is also possible to combine different printing techniques. For example, varnish may first be applied using screen printing, and then further pattern elements may be added using another printing technique such as the aforementioned inkjet printing.

Therefore, the means for partially coating one side 20 of a substrate 2 may also comprise means for applying the varnish 4 by at least one technique selected from intaglio printing, flexographic printing, pad printing, and screen printing, alternatively or in addition to the application by the inkjet technique. It is also possible to combine different printing techniques.

According to a preferred embodiment of the invention, a radiation-curing varnish is used as the varnish 4 and solidifies to form a varnish layer 40 when exposed to high-energy radiation, preferably UV light. For this purpose, a UV light source 11 is provided in the illustrated example, the light of which is directed onto the substrate 2.

Figure 2:
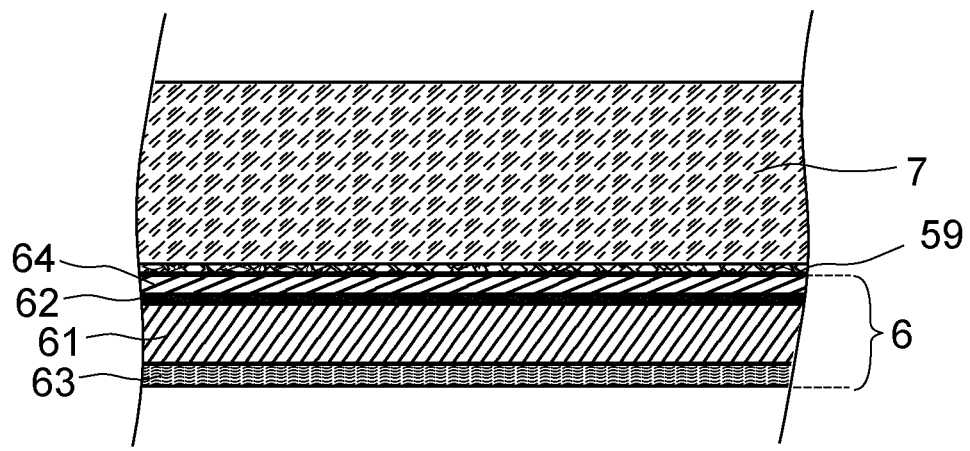
FIG. 2 shows an example of a laminate comprising a carrier film 7 and a foil 6.

FIG. 2 shows an example of a laminate comprising the carrier film 7 and the foil 6. Foil 6, in turn, may be a laminate comprising several layers. A metallization 62 on a film layer 61 is particularly preferred. The metallization 62 may be covered by a cover layer 64. An adhesive layer 63 is provided on one side of the foil 6. It may be in the form of a hot-sealing layer, for example, and bonds the foil 6 to a substrate under the impact of heat and pressure.

Foil 6 is attached to the carrier film 7 through a release agent 59 which provides fixing to the carrier film on the one hand, and on the other hand allows detachment when the adhesive layer 63 has been bonded to the substrate. For example, a wax layer is a suitable release agent.

Figure 3:
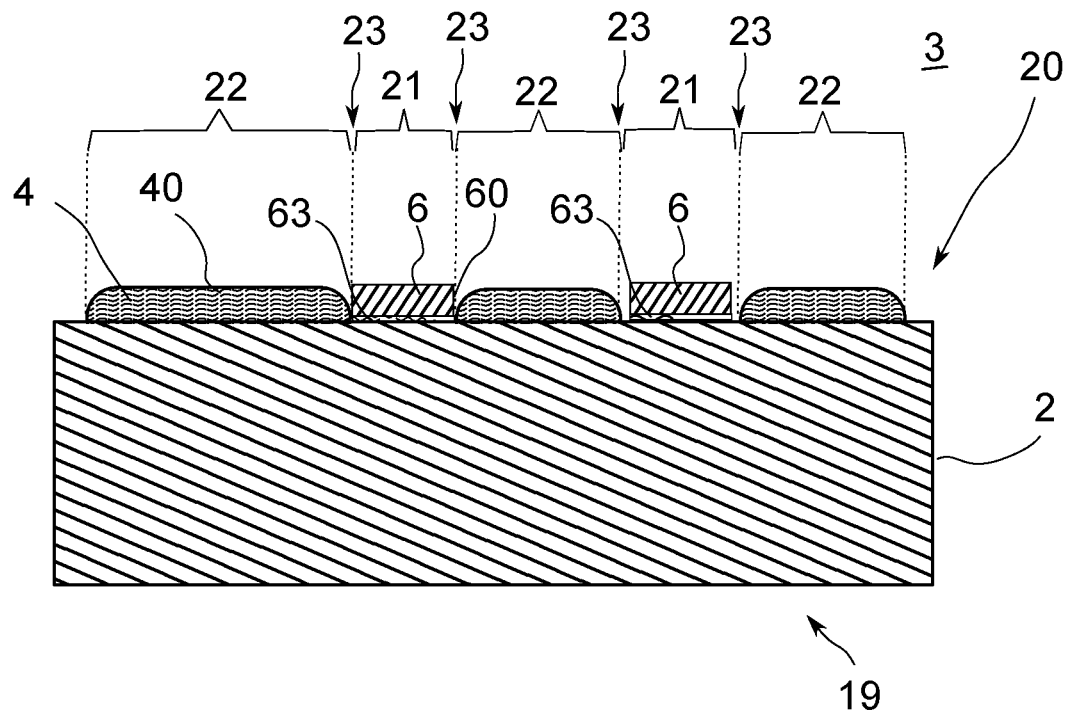
FIG. 3 shows a printed product.

FIG. 3 shows a cross-sectional view of a printed product 3 as it can be obtained by the invention.

The printed product 3 that can be produced by a method or a device according to the invention comprises a varnish layer 40 on one side 20 of the substrate 2, the varnish layer 40 covering the surface of the side 20 of substrate 2 in certain areas, so that at least one area 22 is coated with the varnish layer 40 and at least one adjacent area 21 of the side 20 is free of the varnish layer 40, and the varnish layer 40 is raised so that the surface of the adjacent area 21 is at a lower level than the surface of the varnish layer 40, and a foil 6 is applied to the substrate 2 and bonded thereto in this adjacent area 21, and the edge 60 of the foil 6 extends along the boundary 23 between the coated area 22 and the adjacent uncoated area 21.

Thus, the surface of the printed product is provided with alternating areas that are either coated with the varnish 4 or have the foil 6 laminated thereto. The manufacturing process achieves precise fitting of the foil 6 into the shape of the uncoated areas 21. This printed product allows to achieve new design options compared to, for example, the method according to US 2010/0212821 A1. In processes, for example, in which the foil is applied onto a varnish layer and bonded to the varnish layer, the foil itself is raised. However, if the foil 6 and the varnish layer are applied next to and adjacent to one another, it is even possible to level out a relief structure. For example, according to a further embodiment of the invention, it is contemplated that the foil 6 at least reduces the level differential between the surface of the varnish layer 40 and the surface of the substrate 2 in the uncoated area 21, optionally even completely levelling it out, so that an essentially flat surface is created. If, according to a further embodiment of the invention, the varnish layer has a greater layer thickness than the thickness of the foil 6, it is furthermore possible to produce an effect which can otherwise only be produced by deep embossing of the foil. As already mentioned, the invention can in particular also be used for metallized foils. In this case, the result is an appearance in which metallized and varnished areas directly adjoin each other.

The layer thickness of the varnish layer 40 preferably ranges from 1 to 100 micrometers, most preferably from 2 to 50 micrometers. In principle, but especially in the case of smaller layer thicknesses, the foil 6 may even be thicker than the varnish layer 40, so that the surface of the foil 6 will be at a higher level than the surface of the varnish layer 40, or so that the foil elements form raised areas.

It will be obvious to a person skilled in the art that the invention is not limited to the examples shown in the figures, but can be varied in various ways within the scope of the subject matter of the appended claims. For example, two or more different varnishes and/or two or more different foils may be combined with one another for the invention, in order to expand the design options for print enhancement.

Figure 4:
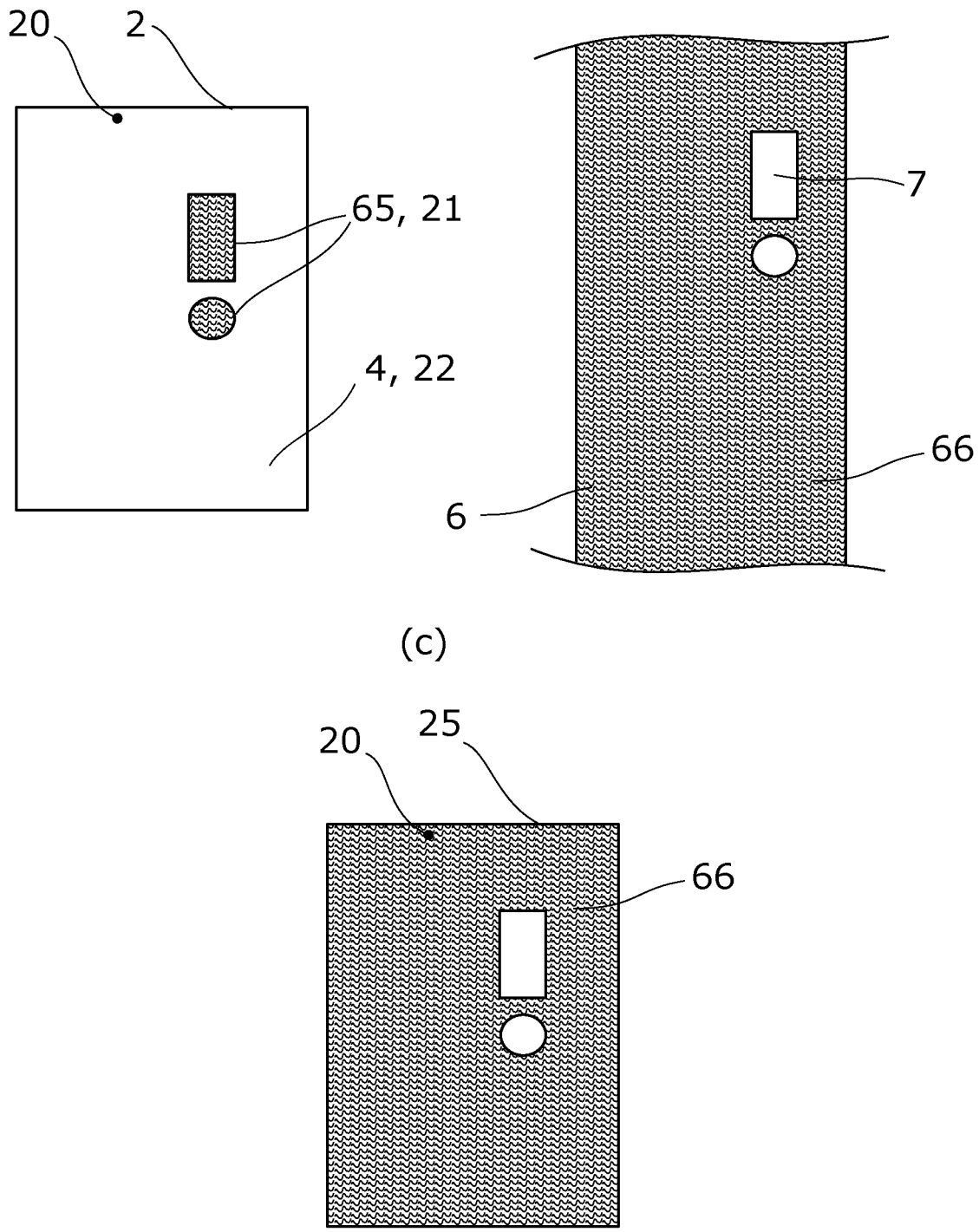
FIG. 4 shows steps in the manufacturing of a printed product using an auxiliary substrate.

Otherwise than in the embodiments discussed above, the portion of the foil 6 that is not adhesively bonded to the substrate 2 may also be used for print enhancement. In this embodiment, the varnish pattern on the substrate is used to apply, to a further substrate, a foil that is shaped like the varnish pattern. The further substrate may then represent the actual finished printed product. As in other embodiments, the method again basically comprises partially coating a substrate 2 on one side 20 with a varnish 4 so as to obtain at least one coated area 22 and at least one uncoated area 21 on this side 20, and subsequently applying a foil 6 onto the side coated with the varnish 4 and adhesively bonding it to the substrate, while this foil 6 is designed so as to adhesively bond to the material of the substrate, but not to the varnish, so that the adhesive bonding of the foil occurs selectively in at least one uncoated area 21, and following the adhesive bonding the foil is severed along the dividing line between the coated and uncoated areas. Panel (a) of FIG. 4 shows the substrate 2 that has been provided with the foil 6 in areas thereof in this way. This substrate is an auxiliary substrate, since it is not the portion 65 adhesively bonded to the substrate 2, that will be used for the enhancing, but rather the remaining complementary portion 66 of the foil 6. This second, complementary portion 66 is shown in panel (b). As already described above, it is advantageous to provide the foil 6 on a carrier film 7. So, when the portion 65 has been detached, the complementary portion 66 of the foil 6 remains on the carrier film 7, as shown in panel (b).

This portion 66 of the foil 6 is then at least partially adhesively bonded to a further substrate 25, in a second step, so that the further substrate 25 will have areas 66 provided with foil 6 which are at least partially complementary to the areas 65 provided with foil of the auxiliary substrate 2. This complementary patterned substrate 25 is shown in panel (c).

According to a refinement of the embodiment involving an auxiliary substrate, it is contemplated that the foil is disposed on a carrier film, as already mentioned above, and that the carrier film 7 is pressed against the substrate 2 with the side on which the foil 6 is disposed for adhesively bonding the foil 6. Now, if the surface of the foil can be embossed multiple times with the same foil, it is possible to use one and the same auxiliary substrate multiple times. In this case, the yet unused foil on the auxiliary substrate is released from foil 6 by the non-varnished areas of the auxiliary substrate in a first step, and in a second step the remainder of the foil 6 is transferred from the carrier film 7 to the substrate to be enhanced. For example, in a machine dedicated for this purpose it is possible to permanently install the auxiliary substrate in one station, and then the foil is always displaced by the format length, pre-patterned on the auxiliary substrate, moved to the next station, and there the target substrate is enhanced. This provides an inexpensive way for making and using a printing plate for foil enhancement, especially for small print jobs.

According to a further embodiment, the foil 6 disposed on the carrier film 7 is adhesively bonded to the substrate 2 by being pressed against it, as in the previous example. At the same time, the carrier film 7 represents the substrate which is the auxiliary substrate in this case. For this purpose, the foil 6 is transferred to another area of the carrier film. Expediently, there is no other foil 6 in this other area. For example, this other area may be the rear side of the carrier film, on which no foil 6 is disposed. According to an alternative, this other area is an area from which the foil 6 has previously been removed by transferring it.

The method according to these embodiments contemplates that the foil is transferred from a carrier film to the further substrate 25, the carrier film having a first surface portion with foil 6 provided thereon and a second surface portion without foil 6 provided thereon, and the second surface portion of the carrier film 7 is partially coated with the varnish so that this surface portion comprises at least one coated area 22 and at least one uncoated area 21, and the foil is transferred from the first surface portion to the uncoated area 21 of the second surface portion so that part of the foil remains on the first surface portion, and the foil remaining on the first surface portion is then adhesively bonded to the further substrate 25.

For this purpose, FIG. 5 shows a device which can be used to provide substrates 25 with a foil 6 according to this embodiment. As in the embodiment shown in FIG. 1, the foil 6 is disposed on a carrier film 7. So, in this case, the carrier film 7 at the same time is the substrate 2 which is coated with varnish 4, namely on the side of the carrier film 7 on which no foil 6 is provided. Thus, the opposite sides of the carrier film 7 define a first surface portion 70 with foil 6 and a second surface portion 71 without foil. As in the embodiment shown in FIG. 1, the coating with varnish 4 is achieved using an inkjet print head 9. The carrier film 7 is guided around a plurality of rollers 27 such that the two sides, that is the surface portions 70, 71 face one another. The two surface portions 70, 71 are pressed together by a pressure roller 17 and the foil 6 is transferred to the second surface portion 71 in the areas that are not provided with varnish 4 or with the varnish layer 40. The carrier film 7 including the foil 6 transferred to the second surface portion 71 is then pressed against and transferred to the further substrates 25 that are transported on the conveyor belt 15, by a further pressure roller. As in the embodiment shown in FIG. 1, the substrates transported by the conveyor belt may be printed products and/or sheets of paper or cardboard. This embodiment produces a pattern of the foil 6 on the further substrate 25, which pattern corresponds to the pattern of the varnish 4 on substrate 2, i.e. specifically on the carrier film 7 in this case. Therefore, more generally, without being limited to the illustrated example, the device 1 in this embodiment is configured to provide a varnish layer 40 on a second surface portion 71 of the carrier film 7, which is not provided with the foil 6, and to transfer foil 6 from a first surface portion 70 provided with foil 6 to the second surface portion 71 to areas thereof which are not provided with varnish 4. Then, as explained above, the device 1 may furthermore be configured for transferring this transferred foil 6 to a further substrate 25, in particular a printed product and/or a sheet of paper or cardboard.

The two embodiments may also be combined with one another, by transferring the foil 6 to the substrate 2 in two steps. In the first step, the substrates 2 are provided with varnish, so that part of the foil 6 is transferred to the areas not coated with varnish. In a second step, another part of the foil is transferred to other substrates. If these additional substrates do not have a layer of varnish that would prevent the transfer, then a complementary pattern of the foil will be resulting on these additional substrates. Such a multiple and in particular complementary transfer is advantageous since it allows to entirely exploit the foil 6 provided on the carrier foil 7, or at least to a large extent.

Instead of transferring the foil 6 to the rear side of its carrier film 7 in the first step, as explained in the previous example, the foil 6 may also be partially transferred to an auxiliary substrate in the first step, and then the remaining portions can be transferred to the substrate 25 in a second step, as disclosed in the example.

LIST OF REFERENCE NUMERALS

1 Device for processing substrates for printed products
2 Substrate
3 Printed product
4, 5 Varnish
6 Foil
7 Carrier film
8 Control device
9 Print head
11 UV light source
12 Conveyor means
13 Sheet feeder
14 Sheet discharger
15 Conveyor belt
17 Pressure roller
19, 20 Sides of 2
21 Uncoated area of 20
22 Coated area of 20
23 Boundary, dividing line between 21, 22
25 Second substrate
27 Roller
40 Varnish layer, coating
59 Release agent
60 Edge of 6
61 Film layer
62 Metallization
63 Adhesive layer
64 Cover layer
65, 66 Complementary portions of 6
70 First surface portion of 7 with foil 6
71 Second surface portion of 7 without foil 6

The invention claimed is:

1. A method for enhancing printed products, comprising partially coating a substrate (2) on one side (20) with a varnish (4) so as to obtain at least one coated area (22) and at least one uncoated area (21) on said side (20), and subsequently applying a foil (6) onto the side (20) coated with the varnish (4) and adhesively bonding it to the substrate (2), wherein said foil (6) is designed so as to adhesively bond to the material of the substrate, but not to the varnish (4), so that the adhesive bonding of the foil (6) occurs selectively in at least one uncoated area (21), and wherein following the adhesive bonding the foil (6) is severed along the dividing line (23) between the coated and uncoated areas (21, 22) so that a substrate (2) is obtained which has at least one area (22) coated with varnish (4) on one side (20) thereof, and an adjacent area (21) not coated with said varnish (4), with a foil (6) adhesively bonded to the substrate in said area not coated with varnish 4, with the edge (60) of said foil adjoining the area (22) coated with varnish (4),
    wherein the substrate (2) is made of paper or cardboard or
        wherein the substrate (2) is a label substrate.

2. The method of claim 1, wherein the foil (6) is disposed on a carrier film (7), wherein, for adhesively bonding the foil (6), the carrier film (7) is pressed against the substrate (2) with the side on which the foil (6) is disposed.

3. The method as claimed in claim 1, wherein at least two different varnishes (4, 5) are used, which are applied to different areas (22) of said side (20) of the substrate (2).

4. The method as claimed in claim 1, wherein the partial coating of the substrate (2) with a varnish (4) is effected by ejecting droplets of the varnish (4) from an inkjet print head (9) in response to control signals from a control device (8) while moving the substrate (2) relative to the inkjet print head (9).

5. The method as claimed in claim 1, wherein the substrate (2) is coated with a varnish using at least one technique selected from flexographic printing, pad printing, intaglio printing, and screen printing.

6. The method as claimed in claim 1, wherein the substrate (2) represents an auxiliary substrate and the portion of the foil (6) that is not adhesively bonded to the substrate (2) is at least partially adhesively bonded to a further substrate (25), so that the further substrate has areas (66) provided with foil, which are at least in part complementary to the areas (65) provided with foil on the substrate (2) that represents an auxiliary substrate.

7. The method according to the claim 1, wherein the foil (6) is transferred from a carrier film (7) to the further substrate (25), the carrier film (7) having a first surface portion (70) provided with the foil (6) and a second surface portion (71) without foil (6), wherein the second surface portion (71) of the carrier film (7) is partially coated with the varnish (4) so that this surface portion (71) has at least one coated area (22) and at least one uncoated area (21), and wherein the foil (6) is transferred from the first surface portion (70) to the uncoated area (21) of the second surface portion (71) so that part of the foil (6) remains on the first surface portion (70), and then the foil remaining on the first surface portion is adhesively bonded to the further substrate (25).

8. The method as claimed in claim 1, wherein a light-curing varnish is used as the varnish (4), which solidifies when exposed to light, preferably UV light, to form a coating (40).

9. A device for enhancing printed products, in particular for performing the method according to claim 1, comprising
means for partially coating one side (20) of a substrate (2) for a printed product with a varnish (4) in such a way that there is at least one coated area (22) and at least one uncoated area (21) on the side (20);
a foil (6) for being adhesively bonded to the substrate; and
means for applying and adhesively bonding the foil (6) to the substrate (2) on the side (20) coated with the varnish (4);
wherein the foil (6) is designed so as to adhesively bond to the material of the substrate (2), but not to the varnish (4), so that the adhesive bonding of the foil (6) is achieved selectively in at least one uncoated area (21); and
means for severing the foil (6) along the boundary (23) between the coated and uncoated areas (21, 22) following the adhesive bonding, so that a substrate (2) of a printed product is obtained which has at least one area (22) of one side (20) coated with varnish (4) and one adjacent area (21) not coated with said varnish (4), and which has a foil (6) adhesively bonded to the substrate in said area not coated with varnish (4), with the edge (60) of said foil adjoining the area (22) coated with varnish (4).

10. The device of claim 1, comprising conveyor means (12) for moving the substrates (2) past the means for partially coating with a varnish (4) and for applying and adhesively bonding the foil (6) to the substrate (2) on the side (20) coated with said varnish (4).

11. The device as claimed in claim 1, wherein said means for partially coating one side (20) of a substrate (2) comprises an inkjet print head (9) which emits the varnish (4) drop by drop onto the substrate (2) in response to control signals from a control device (8).

12. The device as claimed in claim 1, wherein the means for partially coating one side (20) of a substrate (2) comprise means for applying the varnish (4) by at least one technique selected from intaglio printing, flexographic printing, pad printing, and screen printing.

13. The device as claimed in claim 1, wherein the foil (6) is metallized.

14. The device as claimed in claim 1, wherein the device comprises means for pressing a carrier film (7) provided with the foil (6) against the substrate (2) for transferring the foil (6) from the carrier film (7) to the substrate (2).

15. The device of the claim 1, adapted for providing a layer of varnish (40) on a second surface portion (71) of the carrier film (7), which is not provided with foil (6), and for transferring the foil (6) from a first surface portion (70) provided with foil (6) to the second surface portion (71) to areas thereof which are not provided with varnish (4).

16. A printed product (3), producible by a method or by a device as claimed in claim 1, comprising a varnish layer (40) on one side (20) of a substrate (2), said varnish layer (40) covering areas of the surface of the side (20) of the substrate (2) so that at least one area (22) is coated with the varnish layer (40) and at least one adjacent area (21) of the side (20) is free of the varnish layer (40), wherein the varnish layer (40) is raised so that the surface of the adjacent area (21) is at a lower level than the surface of the varnish layer (40), and wherein a foil (6) is applied to the substrate (2) and bonded thereto in said adjacent area (21), wherein the edge (60) of the foil (6) extends along the boundary (23) between the coated area (22) and the adjacent uncoated area (21).

17. The printed product (3) of claim 16, wherein the foil (6) at least reduces the level differential between the surface of the varnish layer (40) and the surface of the substrate (2) in the uncoated area (21).

18. The printed product (3) as claimed in claim 16, wherein the foil (6) is thicker than the varnish layer (40) so that the surface of the foil (6) is at a higher level than the surface of the varnish layer (40).

19. The printed product (3) as claimed in claim 16, wherein the foil (6) is metallized.

20. The printed product (3) as claimed in claim 16, wherein the layer thickness of the varnish layer (40) ranges from 1 to 100 micrometers.

21. The printed product (3) as claimed in claim 16, comprising a substrate (2) made of paper or cardboard.

* * * * *